(No Model.) 2 Sheets—Sheet 1.

O. T. BUGG.
COTTON HARVESTER.

No. 359,554. Patented Mar. 15, 1887.

WITNESSES:
Fred. G. Dieterich
Jno. E. Prosperi

INVENTOR.
O. T. Bugg,
per J. A. Lehmann,
ATTORNEY.

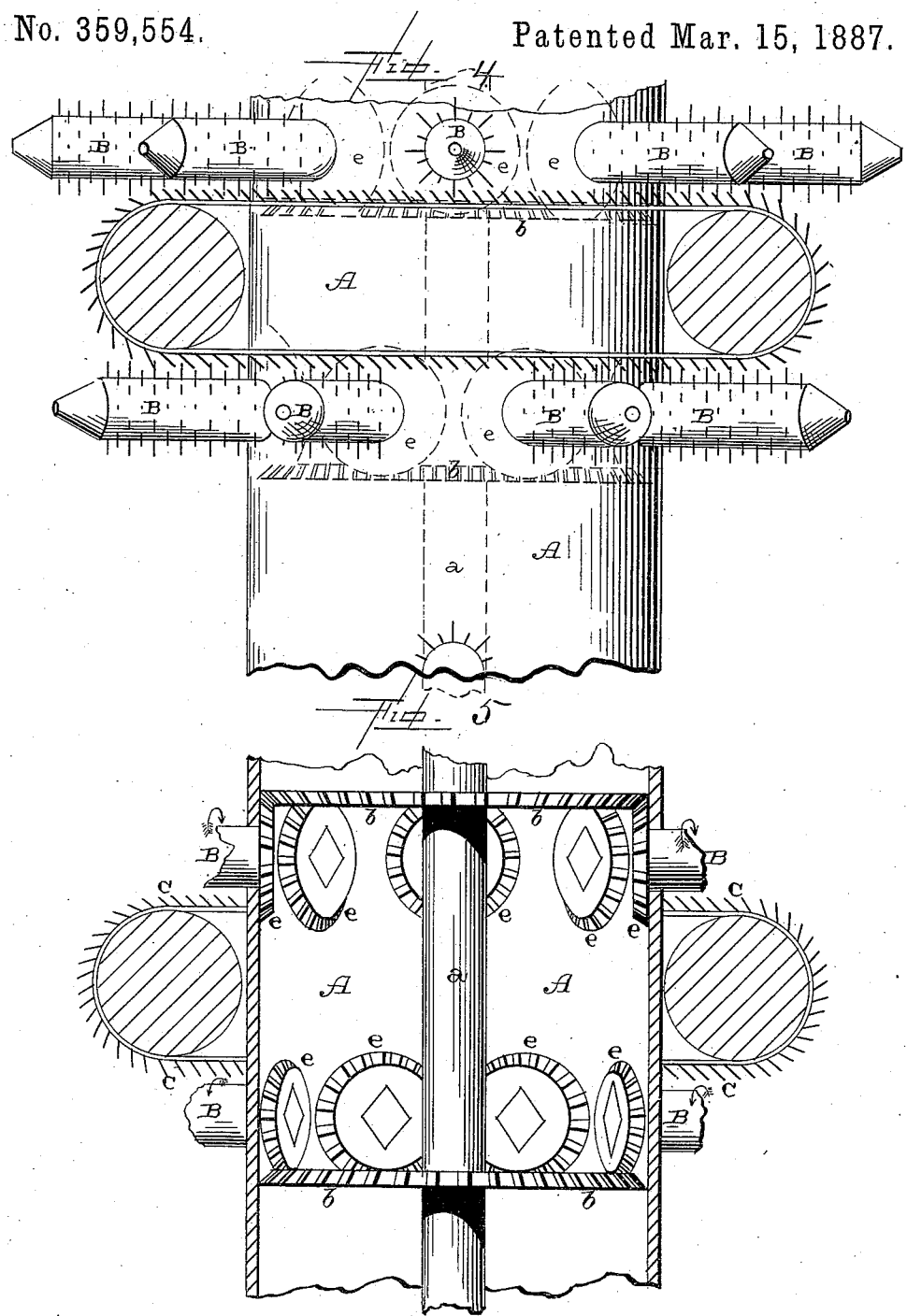

UNITED STATES PATENT OFFICE.

OWEN T. BUGG, OF NEWARK, NEW JERSEY, ASSIGNOR TO THE UNITED STATES COTTON HARVESTER COMPANY.

COTTON-HARVESTER.

SPECIFICATION forming part of Letters Patent No. 359,554, dated March 15, 1887.

Application filed August 31, 1885. Serial No. 175,793. (No model.)

*To all whom it may concern:*

Be it known that I, OWEN T. BUGG, of Newark, in the county of Essex and State of New Jersey, have invented certain new and useful Improvements in Cotton-Harvesters; and I do hereby declare the following to be a full, clear, and exact description of the invention, such as will enable others skilled in the art to which it pertains to make and use it, reference being had to the accompanying drawings, which form part of this specification.

My invention relates to an improvement in cotton-harvesters; and it consists in the combination of vertical revolving cylinders carrying radially-projecting revolving fingers or picker-stems and endless belts provided with suitable teeth for the purpose of cleaning the cotton from the fingers or picker-stems, as will be more fully described hereinafter.

The object of my invention is to provide a simple means for cleaning the cotton which has been gathered by the picker stems or fingers from the picker stems or fingers while they are passing through the boxes at the side of the frame, and thus avoid the necessity of having to reverse the fingers for the purpose of getting rid of the cotton, and thus to permit the fingers to revolve continuously in one direction, instead of first in one direction and then in the other.

Figure 1:
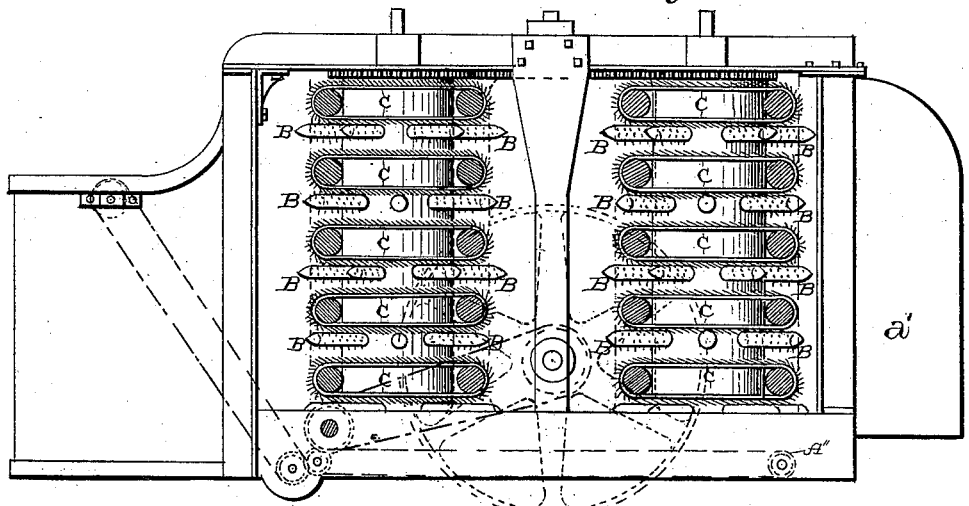
Figure 2:
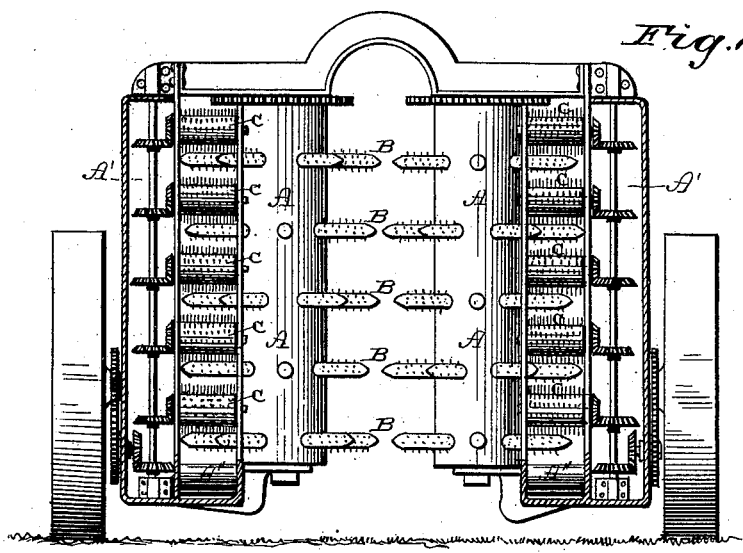
Figure 3:
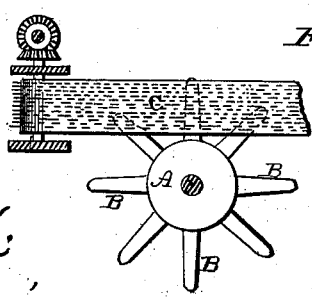

Figure 1 is a vertical section of a machine embodying my invention, taken through the box at one side. Fig. 2 is a vertical cross-section of the machine. Fig. 3 is a detail view.
Fig. 4 is an enlarged view of a portion of one of the cylinders and its picker-stems, the operating mechanism in the cylinder being shown in dotted lines. Fig. 5 is an enlarged vertical section of a cylinder, showing a modification.

A machine is here illustrated in which a suitable number of vertical revolving cylinders, A, are placed upon opposite sides of the machine, so as to operate upon both sides of a row of cotton-plants at the same time, and each cylinder is provided with any suitable number of radially-projecting revolving fingers or picker-stems, B, which are provided with teeth for gathering the cotton while they revolve among the plants. These picker-stems move toward the rear of the machine while they are revolving among the plants, to gather the cotton, and then move toward the front, $a'$, of the machine while passing through the box to be stripped of the cotton adhering to them. As so much of the machine forms no special part of the present invention, it need not be more fully described in this application.

At each side of the frame is placed a box or receptacle, A', through which the picker stems or fingers are made to pass horizontally by the turning of their respective cylinders. In the bottom of each box or receptacle A is placed an endless band or belt, A'', which catches the cotton as it drops from the fingers or picker-stems and conveys it backward to any desired elevator, and from which elevator the cotton is discharged into a bag, basket, or other article placed to receive it. In order to strip or clean the cotton from the horizontal revolving fingers while they are passing through the box A, an endless belt, C, is provided for each series of fingers, arranged in the same horizontal plane, and these belts are made wide enough to extend over the tops of the fingers or picker-stems and act as guards to prevent the cotton from the fingers above falling upon the fingers below and becoming attached thereto. These belts are provided with a series of wires or other cleaning devices, such as are used in carding-machines, for instance, and are made to travel by any suitable mechanism more rapidly toward the front end, $a'$, of the machine than the fingers or picker-stems are moving as they are being carried around by their cylinders.

It is evident that the cleaning devices of the belts will be brought in contact with that surface of the stems which moves in the direction the stem is moving around the cylinder.

The fingers are not only being carried around by the revolving motion of the cylinder, but are made to revolve at the same time upon their own axes, and the movements of the belts must be faster than both of these movements together. These belts, with their teeth or other cleaning devices, strip the cotton from the teeth upon the picker stems or fingers, and the cotton then drops upon the endless belt below, and by this belt the cotton is carried to the end of the box or receptacle, and drops upon the endless belt in the bottom of the box, as above described. Where the cotton is allowed to drop from the picker-stems or fingers, it falls upon those picker-stems or fingers below, and, being caught by the rapidly-revolving teeth, adheres very tenaciously thereto, and causes considerable trouble in cleaning the lower fingers. As the belts here shown and described serve as protectors for the lower fingers, all of this trouble is entirely done away with and the lower fingers are as easily cleaned as any of the upper ones.

I do not limit myself to the special mechanism here shown for operating these belts, for they may be operated in many different ways, any mechanism which will cause the belts to move forward toward the front end of the machine more rapidly than the fingers are made to move, so that the wires on the belts will strip the cotton from the fingers, will answer. As here shown, a stationary shaft, $a$, carrying stationary bevel-gears $b$ is placed inside of each cylinder, and with the stationary gears the pinions $e$ on the inner ends of the picker-stems engage. The cylinders in revolving around the shaft $a$ carry the picker-stems B around, and this motion causes the pinions $e$ to revolve the stems upon their axes.

It is not necessary that the belts should be placed above each series of fingers, as is here shown, for they may be placed under them, if so desired. If the belts are placed below the fingers, instead of above them, their movement will have to be reversed, so as to enable them to clean the cotton from the barbs upon the picker-stems. In case it is desired to decrease the number of belts that are used, one horizontal row or series or fingers will be made to revolve continuously in one direction, and the next row or series of fingers just below it will be made to revolve continuously in the opposite direction, and then one belt will be made to clean two sets or series at the same time. The reversed movement of one series of fingers will be accomplished by reversing the position of the gears which drive them upon the stationary shaft placed inside of the cylinder, as shown in Fig. 5.

Having thus described my invention, I claim—

1. In a cotton-harvesting machine, the combination of a vertical revolving cylinder, radially-projecting picker-stems carried by the cylinder, mechanism for revolving the stems around their own axes, a series of stripper-belts, and a mechanism for giving the belts a movement in the same direction as the stems, the belts being made to move more rapidly than the combined motion of the stems, substantially as shown.

2. In a cotton-harvester, the combination of a vertical revolving cylinder, radially-projecting picker-stems carried by the cylinder, mechanism for revolving the stems around their own axes, a series of stripper-belts arranged over the fingers and moving in the same direction, and mechanism for operating the belts and moving them more rapidly than the combined motions of the stems, substantially as described.

3. The combination of a vertical revolving cylinder, radial revolving picker-stems carried thereby, and endless stripper-belts placed above the tops of the horizontal series of fingers, to prevent the cotton falling from one series of fingers from catching on the series of fingers beneath, substantially as set forth.

In testimony whereof I affix my signature in presence of two witnesses.

OWEN T. BUGG.

Witnesses:
F. A. LEHMANN,
JNO. E. PROSPERI.